United States Patent [19]
Bergler

[11] Patent Number: 5,572,675
[45] Date of Patent: Nov. 5, 1996

[54] APPLICATION PROGRAM INTERFACE

[75] Inventor: Frank Bergler, Niefern, Germany

[73] Assignee: Alcatel N.V., Rijswijk, Netherlands

[21] Appl. No.: 231,029

[22] Filed: Apr. 22, 1994

Related U.S. Application Data

[63] Continuation-in-part of Ser. No. 885,119, May 18, 1992, abandoned.

[30] Foreign Application Priority Data

May 29, 1991 [DE] Germany ............. 41 17 510.7

[51] Int. Cl.$^6$ ...................................... G06F 13/00
[52] U.S. Cl. ................ 395/200.2; 364/DIG. 1; 364/284.4; 364/284
[58] Field of Search ..................... 395/200, 700, 395/200.02, 200.2

[56] References Cited

U.S. PATENT DOCUMENTS

| | | | |
|---|---|---|---|
| 5,315,705 | 5/1994 | Iwami | 395/200 |
| 5,499,343 | 3/1996 | Pettus | 395/200.2 |

FOREIGN PATENT DOCUMENTS

| | | |
|---|---|---|
| 0259659 | 3/1988 | European Pat. Off. . |
| 0288713 | 11/1988 | European Pat. Off. . |
| 3820835 | 1/1989 | Germany . |
| 3908459 | 9/1989 | Germany . |
| 4117510 | 12/1992 | Germany . |
| 2217067 | 10/1989 | United Kingdom . |

OTHER PUBLICATIONS

"Proceedings of the National Communications Forum", Bd. 44, (1990) Oct. 8/10, Chicago, Illinois, pp. 724–732.
"Der Personalcomputer als Telematik–Terminal", T. Drews, Nachrichten Elektronik Und Telematik, Nr. S2, Oct. 1986, Heidelberg, Deutschland, pp. 3–7.
"Interface board for PCs providing SO Interface with voice and data communications capabilities", by F. Caussarleu et al Proc. of the Int. Conference on ISDN '88, Jun. 1988, London, pp. 251–262.
"ISDN–Wann geht die Puste aus?", Funkschau, No. 23, 1989, pp. 24–31.
"PC–Kommunikation, Ende des Chaos?", Funkschau, No. 8, 1989, pp. 26–30.

Primary Examiner—Thomas M. Heckler
Attorney, Agent, or Firm—Ware, Fressola, Van Der Sluys & Adolphson

[57] ABSTRACT

An application program interface for integrated services digital networks is implemented so that application programs can be generated independently of network protocols (Layer 1, 2; 1TR6, VN2) and independently of the respective implementation of service features. The application program interface contains for each network service an independent service program module (Telephony, FAX, Packet data, Teletex, . . . ) with a message set representing procedures as specified by standards (CCITT, ETSI, . . . ).

11 Claims, 3 Drawing Sheets

APPLICATION PROGRAM INTERFACE

This is a continuation-in-part of application Ser. No. 07/885,119 filed on May 18, 1992, abandoned.

TECHNICAL FIELD

This invention relates to communications and, more particularly, to an integrated services digital network (ISDN).

BACKGROUND OF THE INVENTION

To be able to connect various application programs of personal computers (PC) with a PC card for an integrated services digital network (ISDN), an application program interface (API) is needed. Such an application program interface is to make it possible to use PC application programs independently of the type and manufacturer of the PC card for the ISDN network ("ISDN-Wann geht die Puste aus?", Funkschau, No 23, 1989, pages 24–31).

A prior art application program interface, the so-called Common ISDN API, ensures that PC application programs (e.g., for file transfer, terminal emulation) are adapted to the ISDN environment independently of the PC ISDN card. This application program interface, however, is not yet usable internationally for different ISDN protocols for the ISDN D channel ("PC-Kommunikation, Ende des Chaos?", Funkschau, No. 8, 1989, pages 26–30).

The Common ISDN API is designed specifically for the ISDN protocol 1TR6 of the German Bundespost, so that for protocols in other countries, such as France or the USA, the application programs have to be adapted.

DISCLOSURE OF INVENTION

Accordingly, the object of the invention is to implement an application program interface which enables different PC application programs to be adapted to an integrated services digital network, the application programs being generally independent of the individual network protocols and the different implementations of service features by these protocols.

According to the present invention, an application program interface (API) providing the connection between a plurality of different application program modules (App1, App2, App3) and a network interface (ACID) of an integrated services digital network (ISDN), the application program interface (API) comprising: a service program module (packet data, Telephony, Teletex, FAX Gr ¾) for each service of the network, each service program module containing a message set representing specified procedures for the individual service, and the application program interface containing means for exchanging the message sets between the application program modules (App1, App2, App3) and the network interface (ACID).

Unlike conventional application program interfaces, which, since network-oriented, contain only one common message set, e.g., one common call connect message, for all services, the modular construction of the application program interface according to the invention eliminates the hitherto existing complexity (the more services, the more complex). Thus, changes are readily possible at any time and no longer necessitate changing all application program modules.

The division of the integrated network services into the individual service program modules for the (basic) services, such as packet data, telephony, FAX Group ¾, teletex, etc., such that each service program module contains a message set representing specified procedures, permits each application program module to be created above Layer 3 of the OSI (Open System Interconnection) model independently of the subsequent specific implementation of each application program module in accordance with (national) protocols. Advantageously, procedures already defined for the individual services by international standards (CCITT, ETSI, ECMA, etc.) will be specified for the individual services.

Even if a service has not been standardized yet, a self-generated message set can be offered which can be readily changed after standardization, since, unlike in prior art solutions, no changes are required in the other service program modules of the application program interface, because an independent service program module is provided for each service.

To exchange the message sets between the application program modules and the network interface, it suffices to provide the application program interface with registers for storing each start call and each release call, so that an exchange is possible by means of associated message queues.

An embodiment of the invention will now be explained with reference to the accompanying drawing.

BEST MODE FOR CARRYING OUT THE INVENTION

Figure 1:
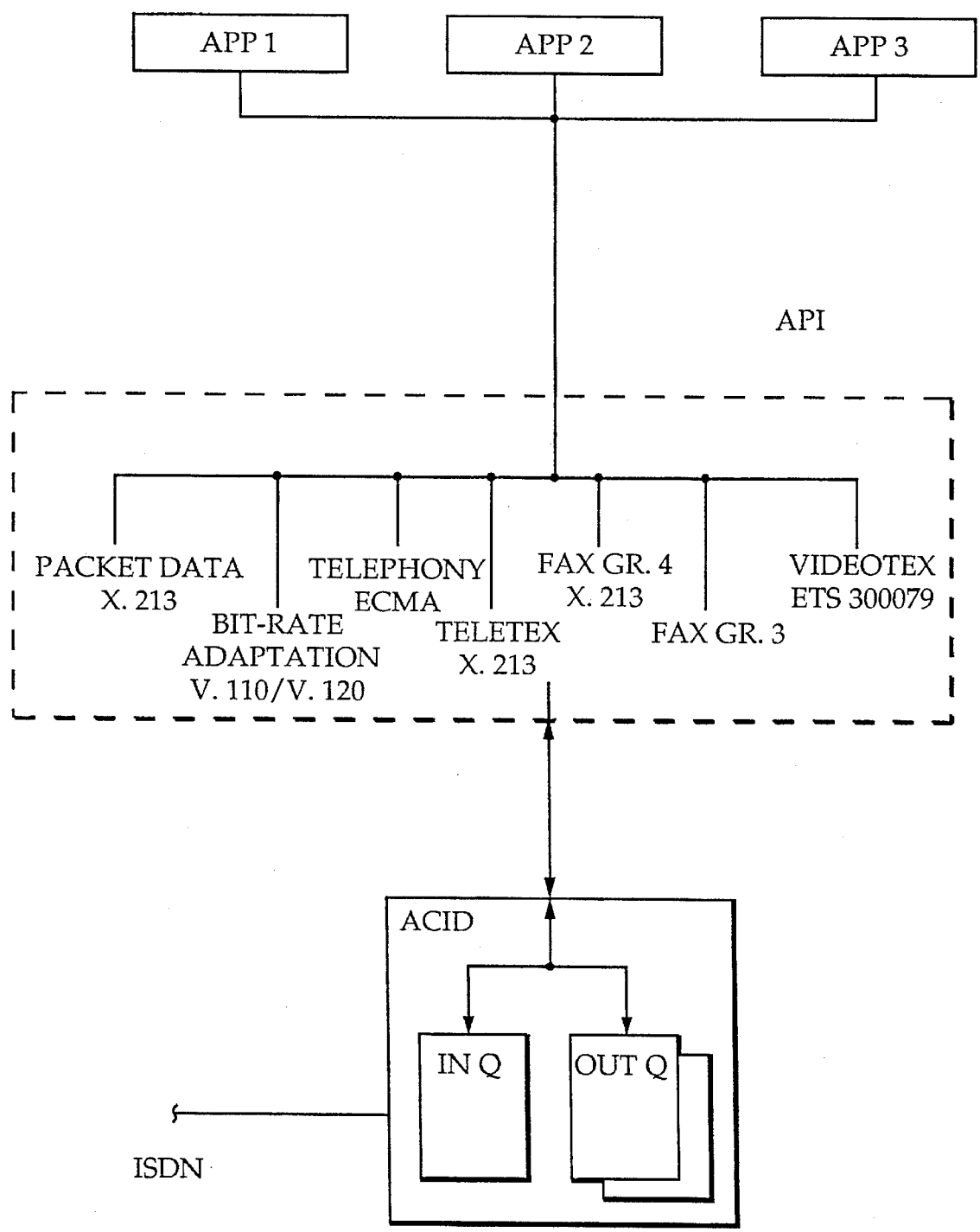
FIG. 1 is a block diagram of an application program interface in accordance with the present invention.

As shown in FIG. 1, an application program interface (API), in accordance with the invention, is connected to a plurality of different application program modules App1, App2, App3, which can be run on a personal computer, for example. It forms an interface to a network interface ACID of an integrated services digital network ISDN.

Figure 3:
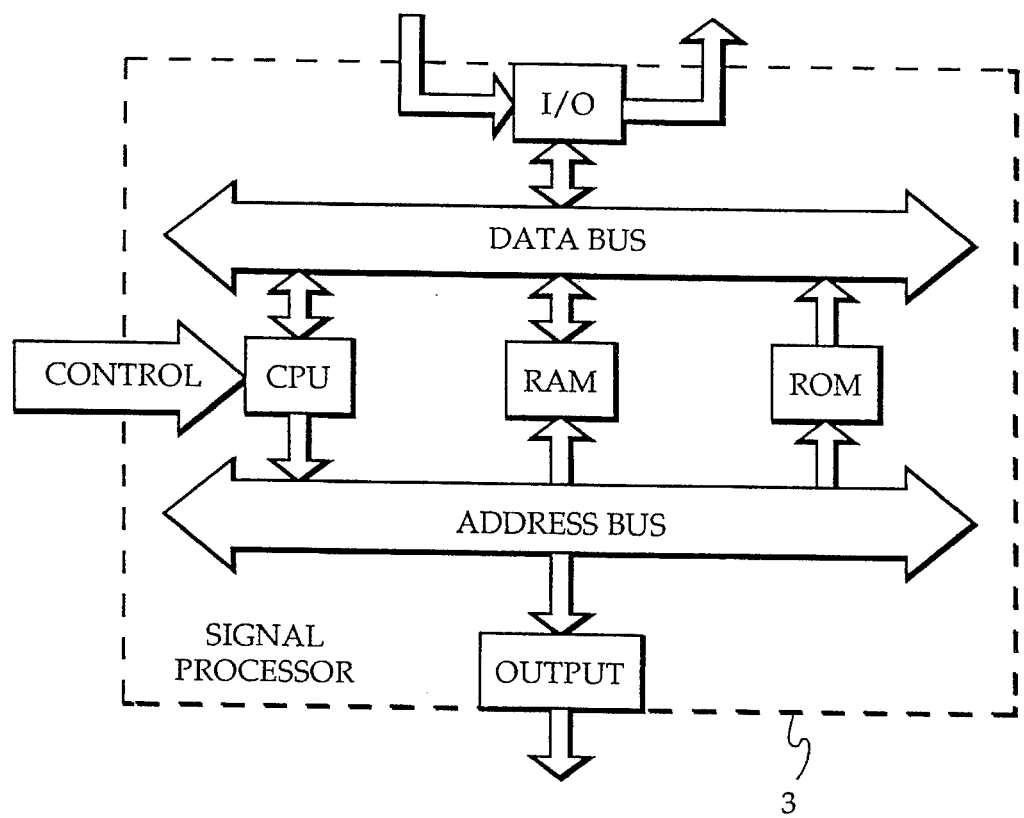
FIG. 3 shows a signal processor such as would be found in a typical computer such as a personal computer which may include application programs and a software embodiment of the application program interface of the present invention.
Figure 4:
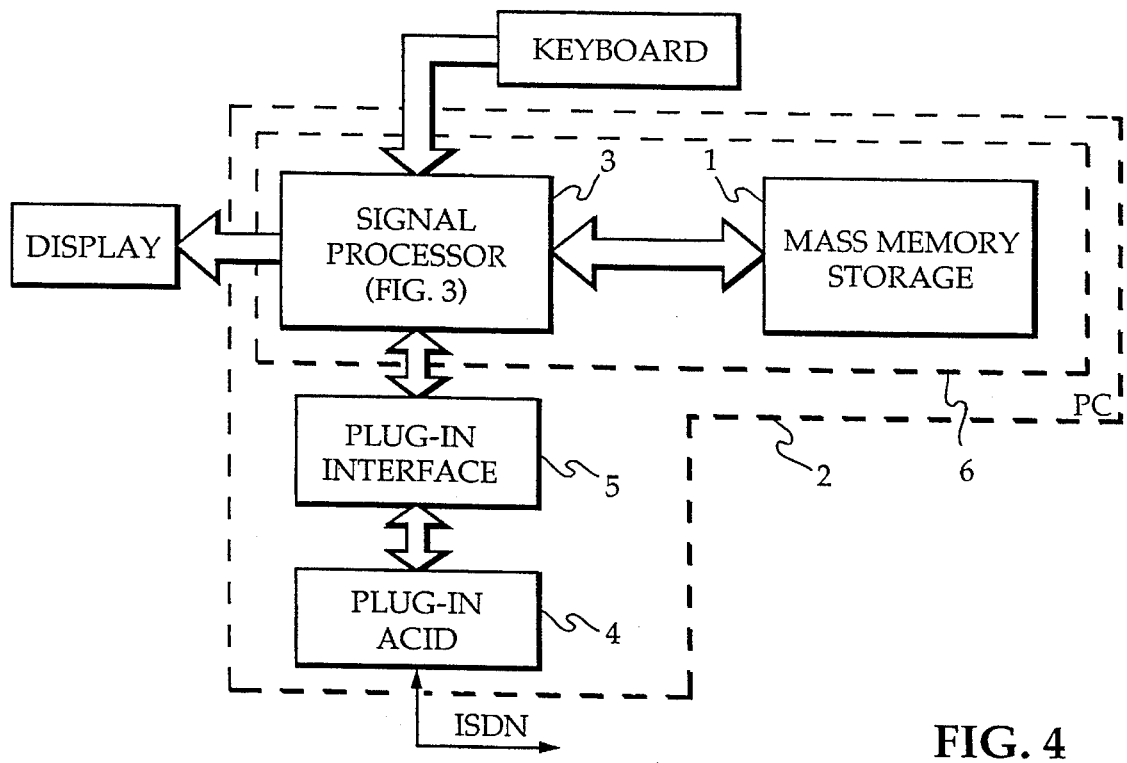
FIG. 4 shows a personal computer with a signal processor such as shown in FIG. 3, mass memory storage and a plug-in ACID.

The application program interface may, but need not, be carried out in software and stored in a mass memory storage unit 1, such as shown in FIG. 4, which may be within a personal computer 2 along with a signal processor 3 and a plug-in network interface (ACID) 4 such as shown in FIG. 1. The signal processor 3 of FIG. 4 may take the form a signal processor such as illustrated in FIG. 3 having a data bus, an address bus, input/output ports, a central processing unit (CPU), a random access memory (RAM) and a read only memory (ROM). Referring back to FIG. 4, the signal processor 3 may interface with a keyboard and a display. The mass memory storage unit 1 may comprise a hard disk drive having hundreds of megabytes of memory available for storing various application programs such as the application programs App1, App2, App3 shown in FIG. 1. It may also include space for storing the API of FIG. 1, such as disclosed in the software embodiment disclosed below. However, it should be understood that the API could be carried out in hardware. In other words, instead of having the mass memory storage unit 1 utilized as a means for exchanging message sets to be described below, there could be hardware registers mounted on a plug-in card 5 within the personal computer having completely discrete components thereon for carrying out the same functions. It will be understood, however, that the preferred embodiment is to use the mass memory storage unit 1 in conjunction with the signal processor 3 as a means for exchanging message sets 6 between application program modules, App1, App2, App3, such as shown in FIG. 1 that are also stored in the mass memory and the network interface (ACID) 4, through the signal processor 3, as will be understood by those skilled in the art in light of the descriptions provided below.

The application program interface API, contains an independent service program module—Packet data, Telephony, Bit-rate adaptation, Teletex, FAX Gr ¾, Videotex—for each service of the network ISDN. Each of the service program modules contains a message set representing specified procedures (on OSI Layer 3).

Advantageously, an internationally agreed standard (e.g., CCITT, ETSI, ECMA, etc.), if present, will be used as a basis for each service.

In the embodiment shown in FIG. 1, CCITT Recommendation X.213 is used for the services Packet data, Teletex, and FAX Group ¾. The procedures for the services Bit-rate adaptation and Videotex are specified in CCITT Recommendation V.110/V.120 and in ETSI Recommendation ETS 300079, respectively. For Telephony, an ECMA standard may be used. Examples of the respective message sets are given in the annex hereto.

For the exchange of message sets between the application program modules App1, App2, App3 and the network interface ACID, the API contains registers for storing each start call and each release call of a message set for an application program module. Each call includes information identifying the desired service (e.g., Telephony), e.g., in the header.

In response to a start call (or release call), a message queue forming a channel is assigned (or released) for the exchange of a message set.

Advantageously, each message queue contains at least one input message queue InQ and at least one output message queue OutQ, which are contained in the network interface ACID and are connectable with the application program modules App1, App2, App3.

Each stored application program module is assigned one output message queue OutQ, so that two or more application program modules can be assigned to one network interface ACID. Of course, there may also be two or more network interfaces ACID, which are then connectable analogously. In that case, it is possible to assign one application program module to two or more network interfaces ACID by simple registration in the API.

The routing of messages to the appropriate destination (ACID, App1, App2, App3) is achieved by a conventional mapping mechanism, preferably starting from the PC.

Application program modules are registered in the API with a start call. By means of a defined bit field it is determined which incoming messages are to be routed to this application program module. The bit field can be represented as follows:

| | |
|---|---|
| Bit 0 | Telephony (3.1 kHz, 7 kHz) |
| Bit 1 | FAX Group 3 |
| Bit 2 | FAX Group 4 |
| Bit 3 | Teletex |
| Bit 4 | Videotex |
| Bit 5 | Packet data |
| Bit 6 | Bit-rate adaptation |
| . | |
| . | Reserved for other services. |

Thus, corresponding message queues can be readily setup.

With the aid of a release call, an associated message queue can be released.

Because of the modular construction of the API, an integrated services digital network can be adapted by addition or removal of service program modules.

Since, in addition, the service program modules are based on internationally standardized (if possible) procedures which are independent of the actual implementation according to, e.g., national protocols (1TR6, VN2, etc.) in the respective existing (PC) network interface ACID, each application program module can be created completely independently based solely on standardized functions.

Figure 2:
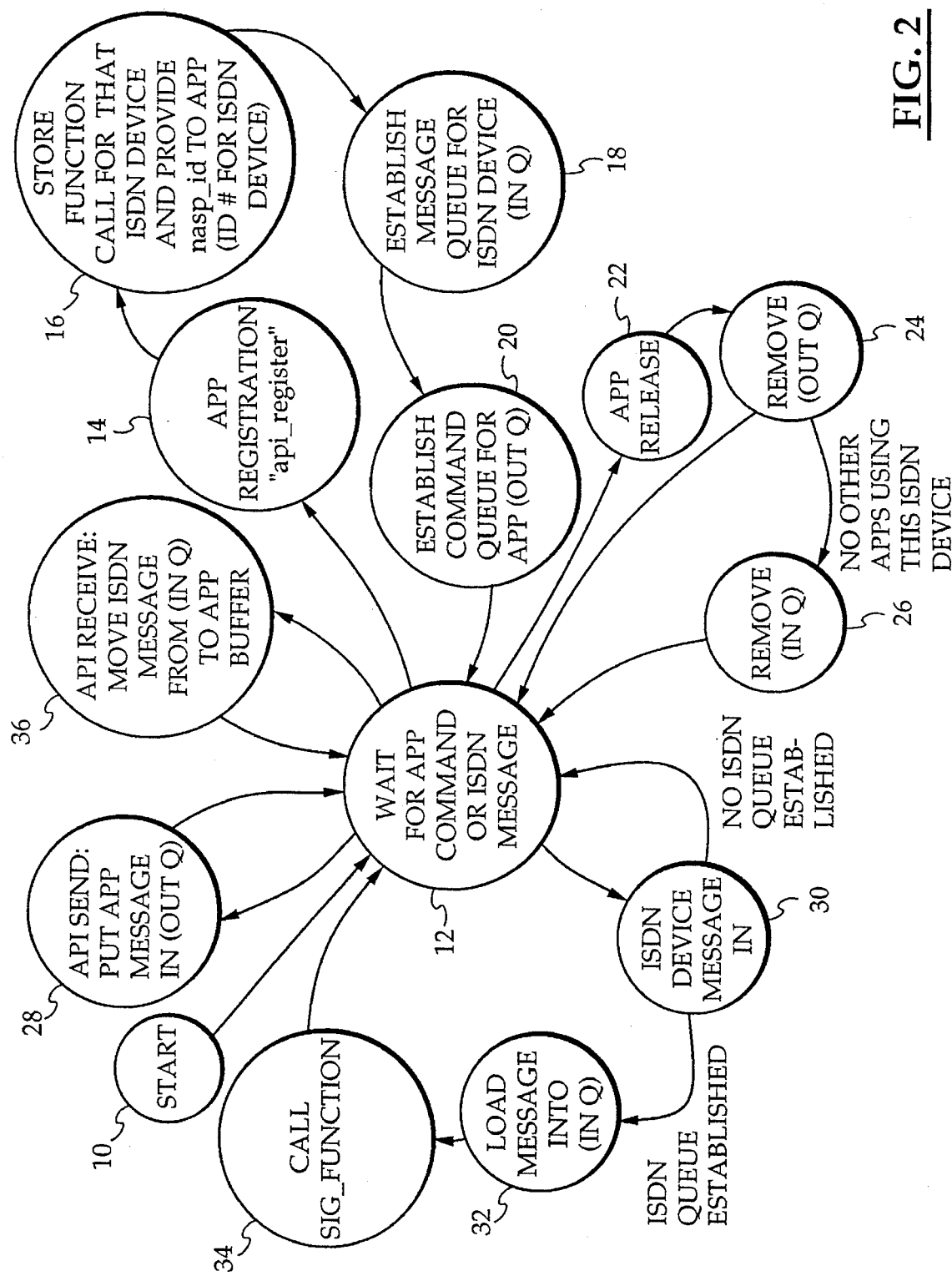
FIG. 2 is a state diagram for an application program interface in accordance with the present invention.

Referring now to FIG. 2 and the description below, API functions, according to an exemplary embodiment of the invention, are described in C language function calls. The naming convention for the function names are lower case letters the function name is preceded by the shortcut "api_"

FIG. 2 shows a start step 10 transitioning to a wait state 12 in which application program commands or ISDN messages from the ACID are awaited by the API.

Indication of Available Messages

Assuming the receipt of a start command from an application program, the application program can define a signal function during registration of it (see api_register below).

Example for a signal function:

```
void api_signal (void)
    nb_messages++;
```

The signal function just counts the number nb of messages which are available for an application. The nb_messages parameter is set to zero at the beginning of the application program.

A nonzero value of the nb_messages variable then indicates that a message can be received.

Registration and Release of Applications

Application programs are registered to the API when they start using it and they are released by the API when they cease using it. For this purpose two calls to the API are provided by the API.

(1.) Registration api register
Syntax:-
    char api_register    (void sig_function, unsigned char acid_id, short inc_call_int, char subaddr)

-continued

| Parameters:- | | |
|---|---|---|
| sig_function | | Pointer to a signal function. This function is called by the API when messages for this application are available. |
| acid_id | | |
| | 0 | automatic assignment of any ACID required |
| | != 0 | specific ACID assignment required. Example:- S0- and Up0-card - almost identical applications both interested on voice calls from Up0 or S0. |
| inc_call_int | | incoming calls interested BITFIELD. This value is used by the API to route incoming calls to the appropriate application program. If another application is already assigned for the required type of incoming calls with the same subaddress specification then the registration fails. |
| | 0 | no incoming calls interested in (when no other application is interested in incoming calls and no handset is available then arriving calls are not answered). |
| | 0xfff | Interested in any incoming calls |
| | bit 0 | Telephony (3.1 kHz voice, 7 kHz voice, speech) |
| | bit 1 | Fax Gr. 3 |
| | bit 2 | Fax Gr. 4 |
| | bit 3 | Teletex |
| | bit 4 | Videotex |
| | bit 5 | x.25 calls (packet data calls) |
| | bit 6 | V.110 rate adaptation calls |
| | bit 7–15 | reserved for other conditions |
| subaddr | | Specifies the subaddress for this application (relevant for routing of incoming calls). Example: |
| | 5–8 | accept calls for subaddress 5 to 8 |
| | 5* | accept all calls, where the subaddress begins with 5 |
| Return values:- | | |
| | 1–127 | nsap_id: Network service access point identifier, this value is used in the message header. |
| | 0 | not used |
| | −1 | no board installed (not responding) |
| | −2 | API not responding |
| | −3 | required board can't be assigned |
| | −4 | already an application assigned for this type of incoming calls with the same subaddress |
| Description:- | | |
| | | This function call is used to establish the message queuing system for this application. One application program can handle several NSAP-IDs, e.g., to have access to more than one ACID. |

Thus, as illustrated in FIG. 2, in the application program registration state 14, the network interface that the application program wants to communicate with is identified. Also identified is the type of information it wishes to receive, e.g., teletex, videotex, etc. It also has the capability to specify an application specific subaddress for routing the same information to more than one application program.

As illustrated in a state 16, a specific application program function is stored to be called by the API when information of the correct type for this application program is available, i.e., to provide the "trigger" for the application program that such information is available and can be read and processed. It also provides a network service access point identifier (a number from 1–127) to be used by the application program when communicating with a particular ACID.

As illustrated by states 18, 20, a message queue is created by the API for the particular end device. The queue consists of at least one input queue (InQ) and at least one output queue (OutQ).

(2.) Release
api release
Syntax:-
short-api_release (char nsap_id)
Parameters:-
nsap_id   Network service access point identifier
Return Values:-
0   Application released
1   Unknown nsap_id
2   API not responding
Description:-
This function call to the API is used to release the application, free the message queues and the application id. All pending operations, calls, messages, connections for this application are cleared and reset. All parameters set by the application (valid per registration or valid per call) are reset to the default values.

The release call is illustrated in FIG. 2 by a state 22 which releases the application and by states 24, 26 which free the message queues and the application ID, as described above. The transition from state 24 to state 26 assumes that no other application programs are using this ISDN device. If that is not the case, a transition is made directly from state 24 back to state 12 so that the ISDN device may continue to be used by any other application programs that may happen to be using it. As described above, all pending operations are cleared and reset at all parameters reset.

Message Communication Services
api send (application program sends to the API which sends to the ISDN device)
As shown by a state 28 in FIG. 2, after application program registration illustrated by the states 14, 16, 18, 20, a transition may be made to a state 28 in which the application program sends a message to an ISDN device. This means that the application program has a software function called to "API_send" specifying a message and a mode. The message header contains the network service access point identifier (positive number 1–127 established during registration) and the command to be sent to the ISDN device. The mode specifies when the API should return to the application program. In the API, the message header is decoded by the API so the message can be formatted according to the appropriate communication protocol and sent to the ISDN device. The address device is mapped to the API. An exemplary embodiment is shown below.

Syntax:-
short api_send (char msg_buf, char mode)
Parameters:-
msg_buf   pointer to the message buffer
mode   The application can send a message in the WAIT or the IMMEDIATE mode.
0   WAIT: wait until command was executed
1   immediate: immediate return to

```
                application
Return Values:-
      0     Sending of the message successful
      1     Input Queue full
      2     API not responding
      3     Message not supported by network ACID
      4     Unknown nsap_id
      5     Unknown Command
      6     WAIT mode required for message
Description:
      The api_send function is used to send messages to
      the API.
      Validity check of messages according to capabilities
      of ACID and network
api receive       (application program receives from
                  the api which in turn received from
                  an ISDN device)
```

As illustrated in a state 30 in FIG. 2, the application program can receive a message (if any) from an ISDN device and will load the message into an ISDN input queue as illustrated in a state 32. A transition to a state 34 results in a call to a pointer to a signal function in order to call the API to notify it that messages for the particular application are available. After transitioning back to the wait state 12, the API moves the ISDN message from the input queue to the application program buffer as illustrated in a state 36.

```
Syntax:-
      short api_receive (char nsap_id, char buffer)
Parameters:-
      nsap_id           Id of application, which wants to
                        receive a message
      char buffer [MAX_RECEIVE_SIZE]
                        buffer for input message, provided by
                        the application
Return values:-
      0     Message received
      1     No message pending
      2     API not responding
Description:
      The api_receive function is used to receive messages
      from the API.
```

Several voice call interaction diagram examples are shown below to illustrate various API send/receive sequences which might occur using the API of the present invention according to the ECMA telephony standard message set listed in the annex.

```
Interaction Diagram
Voice Calls
Outgoing Calls
1.  From application (successful)
       VC_DIAL              →
                            ←      VC_RESULT (ok)
                            ←      HS_STATUS
                                   ('+') (*1)
                            ←      VC_ALERTED
                                   (*2)
                            ←      VC_CONNECTED
                     (Voice)
                     ←→
    (*1)  The handset (HS) can be also off-hook before
          the VC DIAL message is being sent.
    (*2)  The Alert message is not necessary, it is also
          possible that the first message is immediate
          VC_CONNECTED.
2.  From application (engaged)
       VC_DIAL              →
                            ←      VC_RESULT (ok)
                            ←      HC_ENGAGED
                                   (engaged_ID)
                            ...    (*1)
       VC_TERMINATE         →
                            ←      VC_RESULT (ok)
    (*1)  At this point the application program can
          start some additional services, e.g.,
          VC_BOOKING.
3.  From handset (successful)
                            ←      HS-STATUS ('+')
                            ←      HS_STATUS ('1'
                                   ... '9')
                            ...    (*1)
                            ←      HS_STATUS ('1'
                                   ... '9')
                            ←      VC_ALERTED  (*2)
                            ←      VC_CONNECTED
                     (Voice)
                     ←→
    (*1)  The user dials several numbers
    (*2)  At this point the user has dialed enough
          numbers and a connection could be
          established.
          The Alert message is not necessary, it is
          also possible that the first message is
          immediate VC_CONNECTED.
4.  From handset (not successful)
                            ←      HS_STATUS ('+')
                            ←      HS_STATUS ('1'
                                   ... '9')
                            ...    (*1)
                            ←      HS_STATUS ('1'
                                   ... '9')
                            ←      VC_ENGAGED
                                   (engaged_id
                            ...    (*2)
       VC_TERMINATE         →
                            ←      VC_RESULT (ok)
    (*1)  User dials several numbers
    (*2)  At this point the application program
          can start some additional services,
          e.g., VC_BOOKING.
Incoming Call
1.  Handset answers call
                            ←      VC_INCOMING_CALL
                            ←      HS_STATUS ('1')
                            ←      VC_CONNECTED
                     (Voice)
                     ←→
2.  Application answers call
                            ←      VC_INCOMING_CALL
                            ←      VC STATUS (ok)
                            ←      VC_CONNECTED
                     (Voice)
                     ←→
```

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

```
Annex
Telephony: (Voice Call)
      VC Dial
      VC Answer
      VC Terminate
      VC Alerted
      VC Connected
      VC Disconnected
      VC Engaged
      VC Incoming Call
      VC Result
      VC Conference
      VC Drop
      VC Transfer
      VC Hold
      VC Reconnect
```

-continued

VC Booking
VC Camp On
VC Divert
VC Enquire
VC Broker
VC Intrusion
VC Pickup
VC Direct Speech
Packet data as specified in X.213 (CCITT):
PD = Packet data, QOS = Quality of Service
   DATA MANAGEMENT
   PD   SET   QOS
   PD   GET   PARENTS
   CONNECTION PHASE   /   RELEASE PHASE
   PD CONNECT REQ   /   DISCONNECT REQ
   PD CONNECT CONF
   PD CONNECT IND   /   DISCONNECT IND
   DATA TRANSFER PHASE
   PD CONNECT RESP
   PD DATA REQ
   PD DATA IND
   PD DATA ACK REQ
   PD DATA ACK IND
   PD EXP DATA REQ
   PD EXP DATA IND
   RESET SERVICE
   PD RESET REG
   PD RESET CON
   PD RESET IND
   PD RESET RESP
   RESULT MESSAGE
   PD RESULT
Bit-rate adaptation as specified in V.110 (CCITT):
   Global Type: V110 Modem V110 Dial
   V110 Connected
   V110 Incoming Call
   V110 Answer
   V110 Terminate
   V110 Disconnected
   V110 Send
   V110 Receive
   V110 Parameter
   V110 Result
Videotex as specified in ETSI: ETS 300079:
   Basic Videotex Messages VTX Establish
   VTX Release
   VTX Data
   VTX Reset
   VTX Set Param
   VTX Read Param
   VTX Set Read Param
   VTX TFI
   VTX TC Error
   Optional Videotex Messages VTX Channel Open
   VTX Channel Close
   VTX Channel Error
   VTX Begin Application
   VTX End Application
   VTX TPD Begin
   VTX TPD End
   VTX DFK
   VTX Escape
   Global Definition for Videotex Messages VTX ADDR
   VTX Appl
   VTX D UUI
   VTX B CUD
   VTX Cause
   VTX X3 Param
Fax Group 3/4 corresponding to Packet data as specified in X.213.

I claim:

1. Signal processing apparatus comprising:
a signal processor for at least executing a plurality of application program modules (App1, App2, App3);
memory means, connected to said signal processor, for storing the plurality of application program modules (App1, App2, App3); and
an application program interface (API) for providing an exchange of messages between the plurality of application program modules (App1, App2, App3) and a network interface (ACID) of an integrated services digital network (ISDN) supporting a plurality of services, the ACID being connected to said signal processing apparatus, wherein the application program interface (API) includes a service program module (packet data, Telephony, Teletex, FAX Gr ¾) for each service of the network, each service program module containing a message set representing specified procedures for the individual network service.

2. An apparatus as in claim 1, wherein the application program interface (API) further comprises means for storing a start call and a release call of the message set for an application program module (App1, App2, App3), each start and release call containing information identifying the network service.

3. An apparatus as in claim 2, wherein for each stored start call, at least one input message queue (InQ) contained in the network interface (ACID) and at least one output message queue (OutQ) contained in the network interface (ACID), are assigned by the application program interface (API) to an application program module (App1, App2, App3) for exchanging messages of a message set, and wherein for a stored release call, said input and output message queues (InQ, OutQ) are released.

4. An apparatus as in claim 1, wherein one of the service program modules comprises a service program module (Packet data) having procedures for packet data according to CCITT Recommendation X.213.

5. An apparatus as in claim 1, wherein one of the service program modules comprises a service program module (Bit-rate adaptation) having procedures for bit-rate adaptation according to CCITT Recommendation V.110/V.120.

6. An apparatus as in claim 1, wherein one of the service program modules comprises a service program module (Telephony) for procedures for telephony according to an ECMA (European Computer Manufacturers' Association) Recommendation.

7. An apparatus as in claim 1, wherein one of the service program modules comprises a service program module (Teletex) for procedures for teletex according to CCITT Recommendation X.213.

8. An apparatus as in claim 1, wherein one of the service program modules comprises a service program module (FAX) for procedures for fax group 4 according to CCITT Recommendation X.213.

9. An apparatus as in claim 1, wherein one of the service program modules comprises a service program module (Videotex) for procedures for videotex according to ETSI Recommendation ETS 300079.

10. The apparatus of claim 1, wherein the application program interface (API) operating in a wait state (12) is responsive to messages from the application program modules (App1, App2, App3) and the network interface (ACID) for transitioning to send and receive states (28, 36) for exchanging said messages between the application program modules and the network interface.

11. An application program interface (API) for exchanging messages between a plurality of application program modules (App1, App2, App3), which are stored in a memory means and executed by a signal processor, and a network interface (ACID) of an integrated services digital network (ISDN) supporting a plurality of services, said API comprising:

a first interface between said plurality of program modules (App1, App2, App3) and said API;

a second interface between said API and said ACID; and a plurality of service program modules (packet data, Telephony, Teletex, FAX Gr ¾) contained in said API, each service program module corresponding to one of the network services and containing a message set representing specified procedures for the particular network service.

* * * * *